United States Patent
Arunski et al.

(10) Patent No.: US 10,860,626 B2
(45) Date of Patent: Dec. 8, 2020

(54) ADDRESSABLE ARRAY INDEXING DATA STRUCTURE FOR EFFICIENT QUERY OPERATIONS

(71) Applicant: EMC IP Holding Company LLC, Hopkinton, MA (US)

(72) Inventors: Kevin J. Arunski, Sterling, VA (US); Sashka T. Davis, Vienna, VA (US); Zulfikar A. Ramzan, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 263 days.

(21) Appl. No.: 16/176,890

(22) Filed: Oct. 31, 2018

(65) Prior Publication Data

US 2020/0134086 A1 Apr. 30, 2020

(51) Int. Cl.
*G06F 16/31* (2019.01)
*G06F 16/903* (2019.01)

(52) U.S. Cl.
CPC .......... *G06F 16/328* (2019.01); *G06F 16/313* (2019.01); *G06F 16/325* (2019.01); *G06F 16/90344* (2019.01)

(58) Field of Classification Search
USPC ........................................................ 707/696
See application file for complete search history.

(56) References Cited

U.S. PATENT DOCUMENTS

| | | | | |
|---|---|---|---|---|
| 5,426,779 A * | 6/1995 | Chambers, IV | ......... | G06K 9/72 |
| 5,577,248 A * | 11/1996 | Chambers, IV | ........ | G06F 40/12 |
| 6,278,992 B1 * | 8/2001 | Curtis | ................. | G06F 16/2237 |
| | | | | 707/711 |
| 7,079,056 B2 * | 7/2006 | Weaver | ................... | H03M 7/46 |
| | | | | 341/106 |
| 7,644,076 B1 | 1/2010 | Ramesh et al. | | |

(Continued)

OTHER PUBLICATIONS

S. Huston et al., "Efficient Indexing of Repeated n-Grams," Proceedings of the Fourth ACM International Conference on Web Search and Data Mining (WSDM), Feb. 9-12, 2011, pp. 127-136.

(Continued)

*Primary Examiner* — Cam Linh T Nguyen
(74) *Attorney, Agent, or Firm* — Ryan, Mason & Lewis, LLP (57) ABSTRACT

A method includes initializing an addressable array indexing data structure comprising addresses for respective strings having a first length, the addressable array indexing data structure comprising two or more levels of character arrays with each level being associated with a corresponding character position in the strings having the first length. The method also includes extracting variable length strings from one or more records in a data set, and populating entries in the addressable array indexing data structure for extracted strings having the first length with addresses for indexes corresponding to those strings, wherein addresses for strings having the first length are generated by selecting a character value from a character array at each of the levels in the addressable array indexing data structure. The method further includes receiving, from client devices, queries to the records in the data set, and processing the queries utilizing the addressable array indexing data structure.

20 Claims, 7 Drawing Sheets

(56) References Cited

U.S. PATENT DOCUMENTS

| | | | |
|---|---|---|---|
| 10,565,260 B2* | 2/2020 | Pogmore | H04L 9/0869 |
| 2003/0233515 A1* | 12/2003 | Honig | G06F 16/90339 |
| | | | 711/108 |
| 2008/0218387 A1* | 9/2008 | Chang | H03M 7/425 |
| | | | 341/67 |
| 2009/0063404 A1 | 3/2009 | Hacigumus et al. | |
| 2016/0062954 A1* | 3/2016 | Ruff | G06F 40/205 |
| | | | 715/249 |
| 2019/0065494 A1* | 2/2019 | Abali | G06F 12/0866 |

OTHER PUBLICATIONS

T. Hawker et al., "Practical Queries of a Massive n-gram Database," Proceedings of the Australasian Language Technology Workshop, Dec. 10-11, 2007, pp. 40-48, vol. 5.

T. Cormen et al., "Introduction to Algorithms," Third Edition, MIT Press, 2008, 1313 pages.

* cited by examiner

ADDRESSABLE ARRAY INDEXING DATA STRUCTURE FOR EFFICIENT QUERY OPERATIONS

FIELD

The field relates generally to information processing, and more particularly to managing data in information processing systems.

BACKGROUND

Various information processing systems provide capabilities for searching and retrieving stored data. In systems which store or manage large amounts of data, indexing structures may be used to provide efficient search, update, retrieval and other query capabilities. An indexing structure may contain indexes for different strings of text in stored data, with each index maintaining references to or identifiers for the locations of such strings of text in the stored data. As the amount of data increases, however, the amount of storage and computing resources required to store and maintain the indexing structure also increases.

SUMMARY

Illustrative embodiments of the present invention provide techniques for generating an addressable array indexing data structure which improves the performance of search, update, retrieval and other query operations for data management systems. The addressable array representation further reduces an amount of storage resources required for maintaining the indexing data structure.

In one embodiment, a method comprises initializing an addressable array indexing data structure comprising addresses for respective strings having a first length, the addressable array indexing data structure comprising two or more levels of character arrays, each of the two or more levels being associated with a corresponding character position in the strings having the first length. The method also comprises extracting variable length strings from one or more records in a data set, and populating entries in the addressable array indexing data structure for extracted strings having the first length with addresses for indexes corresponding to those strings, wherein addresses for strings having the first length are generated by selecting a character value from a character array at each of the two or more levels in the addressable array indexing data structure. The method further comprises receiving, from one or more client devices, one or more queries to the records in the data set, and processing the one or more queries to the records in the data set utilizing the addressable array indexing data structure. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
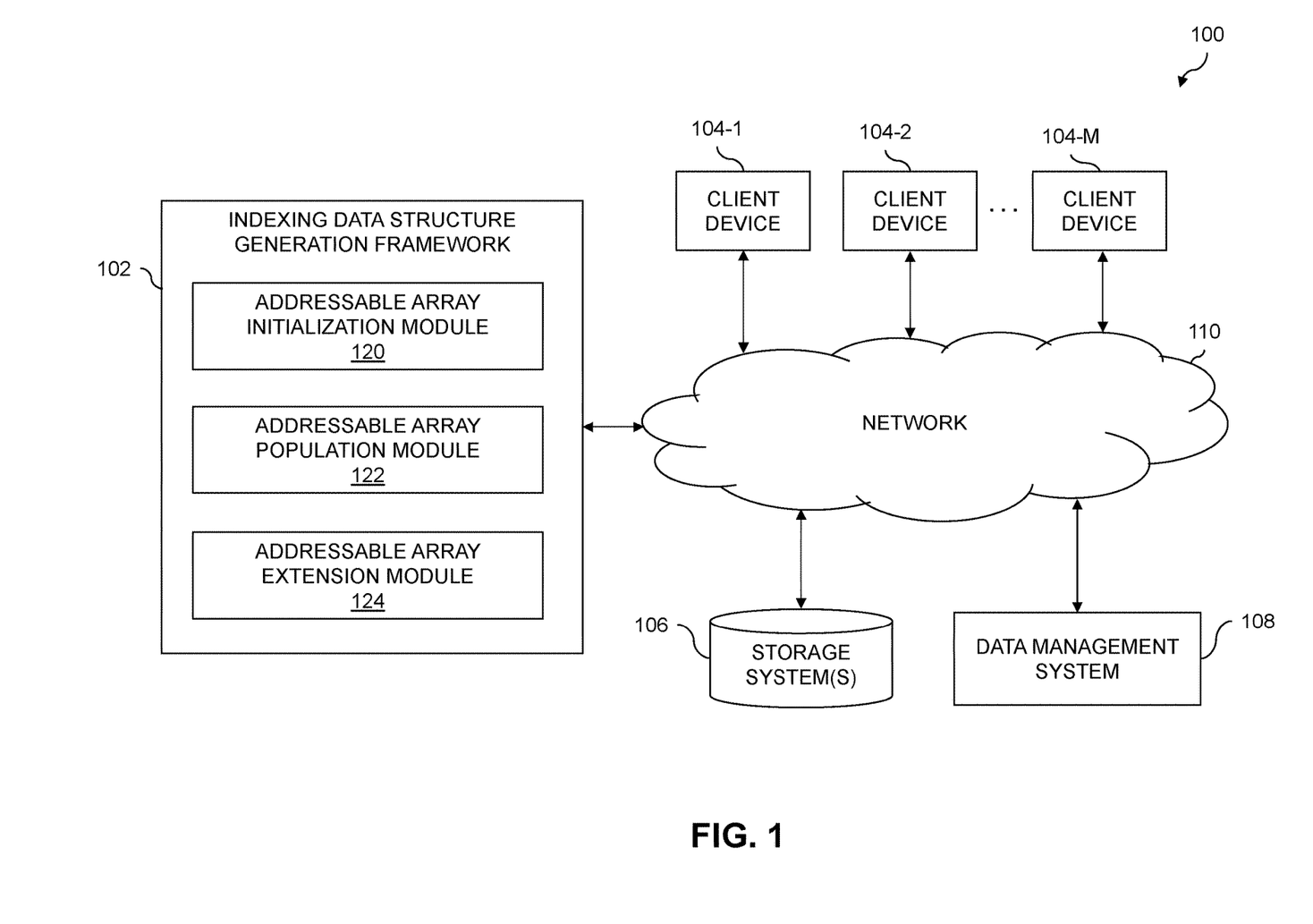
FIG. 1 is a block diagram of an information processing system for generating an addressable array indexing data structure for efficient query operations in an illustrative embodiment of the invention.

FIG. 1 shows an information processing system 100 configured in accordance with an illustrative embodiment. The information processing system 100 is assumed to be built on at least one processing platform and provides functionality for generating an addressable array indexing data structure for fast and efficient search, update, retrieval and other query operations utilizing an indexing data structure generation framework 102. The indexing data structure generation framework 102 manages generation of an addressable array indexing data structure (e.g., a non-prefix tree-like index representation for an N-gram index data structure) for a data management system 108, which may store records or other data in one or more storage systems 106. The data management system 108 may provide functionality for query of records or other data from the storage systems 106. As used herein, the term "query" is used to broadly refer to operations such as search, update and retrieval of records or other data of a data set. In some embodiments, for example, the data management system 108 may comprise a log message collection and processing system for an enterprise or other entity, which collects log messages or other records from various managed devices or other log or event record sources.

The storage systems 106 may comprise one or multiple different storage systems which collectively provide a system of records for storing data managed by the data management system 108. Although shown as separate in FIG. 1, in some embodiments at least a portion of the storage systems 106 may be part of the data management system 108 or the indexing data structure generation framework 102. Also, the indexing data structure generation framework 102 may be implemented at least in part internally to the data management system 108.

The storage systems 106 provide data sources for records that are accessed by various users or data consumers via client devices 104-1, 104-2, . . . 104-M (collectively, client devices 104). In some embodiments, the client devices 104 submit search, update retrieval or other query requests to the data management system 108 for records stored in the storage systems 106. The data management system 108 may utilize an indexing structure to speed up such search and retrieval. In some embodiments, the indexing data structure generation framework 102 improves the efficiency of search, update, retrieval and other query operations through the use of a non-prefix tree-like index representation for an N-gram index data structure.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The indexing data structure generation framework 102, client devices 104, storage systems 106 and data management system 108 may be connected via at least one network 110. The network 110 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The indexing data structure generation framework 102 implements a number of functional modules for generating an addressable array indexing data structure, including an addressable array initialization module 120, an addressable array population module 122 and an addressable array extension module 124.

The addressable array initialization module 120 is configured to initialize an addressable array indexing data structure. It should be noted that "initializing" should be construed broadly, so as to include not only allocating entries in an addressable array indexing data structure but also to include more generally the creation or generation of an indexing data structure. The addressable array indexing data structure is initialized for addresses of strings having a first length (e.g., 3-grams). The addressable array indexing data structure may be a tree-like structure, with multiple levels of character arrays where each level is associated with a particular character position in the strings of the first length. For a first length of 3 (e.g., for 3-grams), the tree would have three levels: a first or top level for the first character position in the 3-gram, one or more second level character arrays for the second character position in the 3-gram, and one or more third level character arrays for the third character position in the 3-gram. It should be appreciated, however, that the first length is not limited solely to 3, and that other embodiments may initialize the addressable array indexing data structure with other levels for other values of the first length (e.g., two levels for 2-grams, four levels for 4-grams, etc.).

The addressable array population module 122 is configured to populate entries in the addressable array indexing data structure with the address for indexes for strings having the first length that are extracted from records of a data set stored in storage systems 106 managed by the data management system 108. Addresses for strings having the first length are generated by selecting a character value from a character array at each of the two or more levels in the addressable array indexing data structure.

The addressable array extension module 124 provides functionality for extending the addressable array indexing data structure that is initialized by module 120, so as to handle longer-length strings (e.g., strings with lengths longer than the first length) that are extracted from records of the data set.

For extracted strings with lengths longer than the first length but shorter than a designated threshold length (e.g., for 4-grams and 5-grams), the addressable array extension module 124 may dynamically generate one or more additional levels in the addressable array indexing data structure (e.g., responsive to extracting strings having a second length longer than the first length but shorter than the designated threshold length). The additional levels of the character arrays may have entries with character values for additional character positions, along with a pointer to the address or array entry in an upper level of the addressable array indexing data structure (e.g., a 4-gram would be identified by reference to a particular 3-gram address and an entry in a 4th character array in an additional level). The array population module 122 may then populate entries in the array indexing data structure with addresses for corresponding indexes for extracted strings having the second length.

For extracted strings with third lengths greater than or equal to the designated threshold length (e.g., for 6-grams), the array extension module 124 determines whether to further extend the addressable array indexing data structure. This determination may be made based at least in part on the size and/or usage of an index of a string that is a sub string of a given string having a third length. For example, if the string of the third length is a 6-gram, a 5-gram of which the 6-gram is a superstring will be considered. If the index for that 5-gram is sufficiently large (e.g., has greater than a threshold number of entries), then the addressable array indexing data structure may be grown to an additional level (e.g., a sixth level). Similarly, if the usage of the index for that 5-gram is high (e.g., above a designated threshold usage), then the addressable array indexing data structure may be grown to an additional level (e.g., a sixth level). In some embodiments, rather than growing an additional level, hash tables are created for longer-length strings (e.g., strings with the third length greater than or equal to the designated threshold length). The hash tables are searched for a hit prior to using the addressable array indexing data structure to process a particular query.

It is to be appreciated that the particular arrangement of the indexing data structure generation framework 102, client devices 104, storage systems 106 and data management system 108 illustrated in the FIG. 1 embodiment is presented by way of example only, and alternative arrangements can be used in other embodiments. As an example, the functionality associated with the addressable array initialization module 120, the addressable array population module 122 and the addressable array extension module 124 may in some embodiments be combined into fewer modules, or may be separated across more modules, with the multiple modules possibly being implemented with multiple distinct processors or processing devices. As another example, the indexing data structure generation framework 102 and/or storage systems 106 may be implemented at least in part within the data management system 108.

At least portions of the addressable array initialization module 120, the addressable array population module 122 and the addressable array extension module 124 may be implemented at least in part in the form of software that is stored in memory and executed by a processor.

Figure 2:
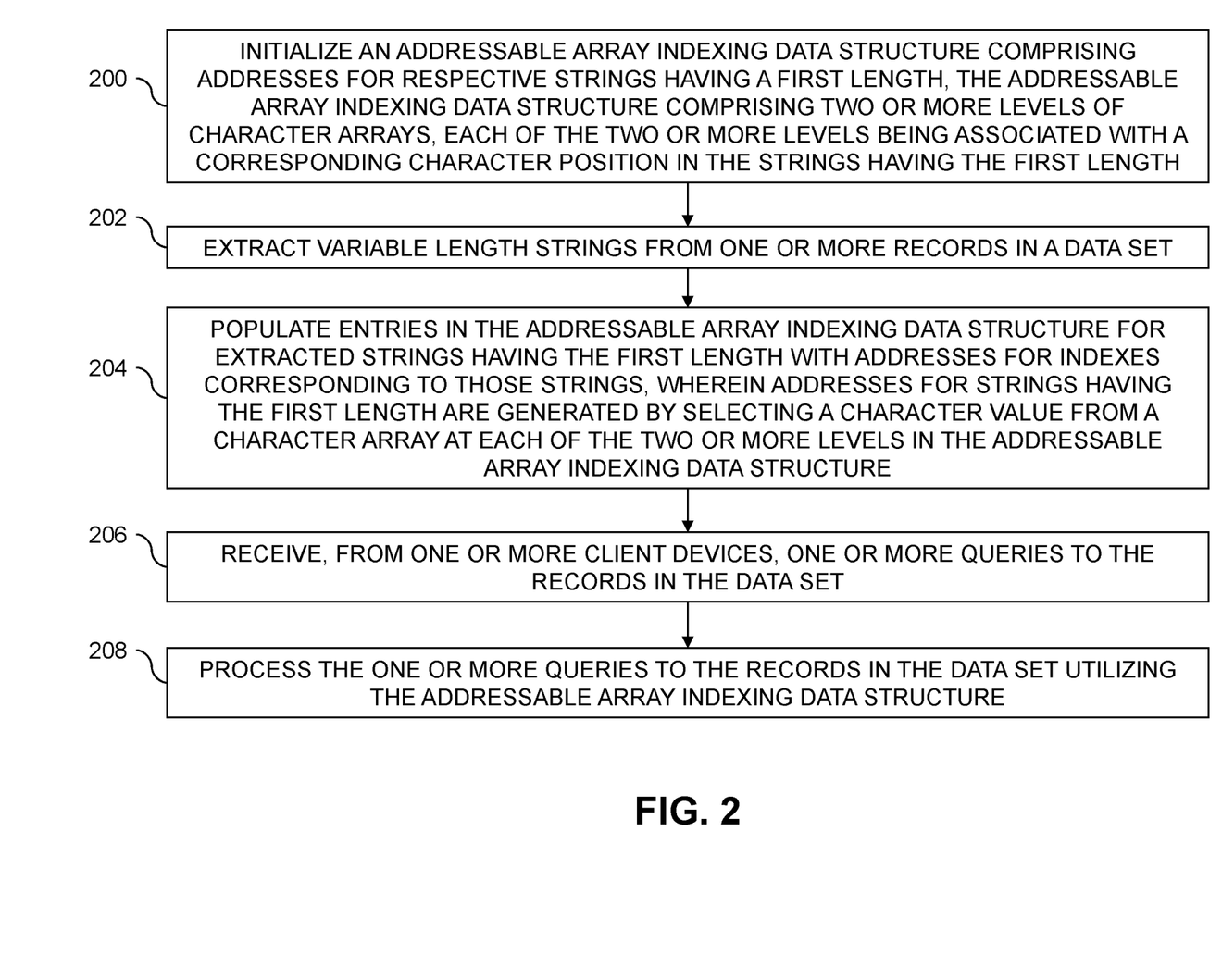
FIG. 2 is a flow diagram of an exemplary process for generating an addressable array indexing data structure for efficient query operations in an illustrative embodiment.

An exemplary process for generation of an addressable array indexing data structure will now be described in more detail with reference to the flow diagram of FIG. 2. It is to be understood that this particular process is only an example, and that additional or alternative processes for generating addressable array indexing data structures can be carried out in other embodiments.

In this embodiment, the process includes steps 200 through 208. These steps are assumed to be performed by the indexing data structure generation framework 102 utilizing the addressable array initialization module 120, the addressable array population module 122 and the addressable array extension module 124. The process begins with step 200, initializing an addressable array indexing data structure comprising addresses for respective strings having a first length. In some embodiments, the first length is 3 for 3-gram strings. The addressable array indexing data structure is initialized with two or more levels of character arrays (e.g., for the first length 3, the addressable array is initialized with 3 levels, for the first length 4, the addressable array is initialized with 4 levels, etc.). Each level is associated with a corresponding character position in the strings having the first length. For a first length of 3 for 3-grams, the first level would be associated with the first character position of a 3-gram, the second level would be associated with the second character position of the 3-gram, and the third level would be associated with the third character position of the 3-gram.

In step 202, variable length strings are extracted from one or more records in a data set. In step 204, entries in the addressable array indexing data structure initialization in step 200 are populated with addresses for indexes corresponding to extracted strings having the first length. Addresses for strings having the first length are generated by selecting a character value from a character array at each of the two or more levels in the addressable array indexing data structure.

The process continues with step 206, receiving, from one or more client devices, one or more queries to the records in the data set. The queries received in step 206 are processed in step 208 utilizing the addressable array indexing data structure initialized in step 200 and populated in step 204.

In some embodiments, the addressable array indexing data structure initialized in step 200 comprises a fixed size direct addressable array that pre-allocates entries for each possible string having the first length in a designated alphabet of characters. Step 200 may thus include setting entries in the fixed size direct addressable array to a null value, and step 204 may include updating entries in the fixed size direct addressable array with addresses of corresponding indexes for respective strings of the first length responsive to extracting instances of those strings from the one or more records in the data set in step 202. In some cases, it is not known whether all possible character values in the designated alphabet of characters will actually be used in strings that are extracted in step 202. In such cases, the character values that are actually used may be determined during a learning phase, with the addressable array indexing data structure being initialized in step 200 as a fixed size direct addressable array that pre-allocates entries only for those character values in the designated alphabet determined to be in use during the learning phase.

In other embodiments, the addressable array indexing data structure initialized in step 200 may comprise a sorted dynamic array that allocates address for respective strings having the first length responsive to extracting instances of those strings from the one or more records in the data set in step 202. In such embodiments, step 204 may include populating a given set of character values in the character arrays of the two or more levels in the addressable array indexing data structure responsive to extracting an instance of a string of the first length having the given set of character values in step 202.

In some embodiments, the addressable array indexing data structure is extended to handle longer length strings (e.g., strings of a second length greater than the first length but less than a designated threshold length) that are extracted in step 202. In such embodiments, step 204 may include dynamically generating one or more additional levels in the addressable array indexing data structure responsive to extracting one or more strings having a second length longer than the first length in step 202. A given one of the additional levels comprises a sorted dynamic character array having entries for a given additional character position. For example, if the second length is 4, the given additional level would comprise a character array for character values at a fourth character position of a 4-gram. Step 204 further includes populating entries in the addressable array indexing data structure with addresses for corresponding indexes for extracted strings having the second length. Addresses for strings having the second length are generated by selecting an address for a given string having the first length and at least one character value from a sorted character array at one or more of the additional levels in the addressable array indexing data structure.

Step 204 in some embodiments may further include determining whether to extend the addressable array indexing data structure with an address for a given string having a third length greater than or equal to the designated threshold length. In this case, the given string is a super string of a shorter length string (e.g., a string of the second length). This determination may be based at least in part on a size of an index corresponding to the shorter length string that is a sub string of the given string. The determination may also or alternatively be based at least in part on a usage of the index corresponding to the shorter length string that is a sub string of the given string.

In some embodiments, hash tables may be created and maintained for high usage longer strings (e.g., strings of the third length with usage greater than a designated threshold usage). Processing the query in step 208 may include, for longer strings of the third length, first searching the hash table for a hit and only using the addressable array indexing data structure responsive to a hash table miss.

As described above, illustrative embodiments provide space and time efficient techniques for the online storage and generation of an N-gram index data structure thereby supporting fast search, update, retrieval and other query operations. In some embodiments, the N-gram index data structure provides efficient search and retrieval for vast collections of text records using exact string matches, or regular expression-driven capability.

Various data management systems, including transaction processing systems, log decoders and concentrators, network traffic monitoring systems, etc., utilize "big data" in that they process data with high velocity, volume, variety, value and veracity. In some such systems, value is observed only or particularly when efficient search and update indexing mechanisms are present. For example, a large enterprise could implement centralized processing of all log messages generated by software and/or hardware appliances in the enterprise network. Each log message may capture information about an event in the enterprise system. The ability to efficiently query the log processing system therefore equates with the ability to monitor and triage the events that occur inside the enterprise system. An intrusion detection system may require streaming processing and indexing of log messages, possibly in addition to traffic monitoring, while an incidence response team may require search and other query access of an extremely vast collection of data to analyze the state of a system over time. In these and other situations, a security operation center analyst may need to retrieve and examine all logs or other records containing a specific string of interest or other potential indicator of compromise. To make this feasible, the system needs to support efficient search and other query of messages with an arbitrary structure and length.

Some embodiments meet these and other needs through the design and generation of an indexing data structure that can support efficient search and other query mechanisms for regular expression match of strings that appear anywhere in a message or log for efficient retrieval of relevant records or other data. In some embodiments, no assumptions are made regarding the structure of the messages or logs, and the query string can have an arbitrary length. Further, some embodiments suppose that the query string can appear not only at word boundaries as a prefix or suffix, but at any arbitrary location inside a larger superstring.

One way to support such functionality is to generate N-gram indexes for all records in the system. An N-gram is a continuous sequence of N items. Each item can be a character, a byte value, an entire word, etc. In some embodiments, N-grams are considered to be sequences of N Universal Text Format (UTF) characters (e.g., UTF-8, UTF-16, etc.). It should be appreciated, however, that the techniques described herein may be used for other types of N-grams.

Consider, for example, the message: Imagination is more important than knowledge. The 3-character N-grams in this message include: ima, mag, agi, gin, iha, nat, etc. The 4-character N-grams in this message include: imag, magi, agin, gina, that, nati, etc. The 5-character N-grams in this message include: imagi, magin, agina, ginat, that, natio, etc. For every N-gram that appears in a collection of documents or other records, the corresponding N-gram index will contain a reference (e.g., a unique identifier) of each record that contains the corresponding N-gram. It should be appreciated that while various embodiments are described herein with respect to N-grams where N=3, 4 and 5, embodiments are not limited solely to consideration of 3-grams, 4-grams and 5-grams. Embodiments may consider or utilize longer or shorter N-grams as desired.

In some embodiments, a space and time efficient N-gram index generation, query and update structure is provided. Note that uni-grams (e.g., 1-grams) and bi-grams (e.g., 2-grams) are not of interest in some use cases, as the corresponding indexes will be of considerable length and may not be useful for optimization and speedup of the search and retrieval of records. Thus, various embodiments consider N-grams having lengths of at least 3. It should be appreciated, however, that in other embodiments or use cases it may be desired to consider uni-grams or bi-grams.

One way to implement an efficient N-gram index storage data structure is to create a Red-Black tree containing every N-gram observed in the collection of documents. A Red-Black tree is a balanced binary tree, where each node must have one parent pointer, left and right child pointers, and a color to maintain the properties of the tree. Each pointer is a machine address in the corresponding machine architecture, typically 9 bytes. A Red-Black tree implementation provides efficient N-gram search, update and insert operations with a worst-case time complexity of O(M), where M is the total number of N-grams observed in the dataset. To implement the N-gram indexing using a Red-Black tree, each node will in addition store the actual N-gram string and a pointer to the corresponding index.

In illustrative embodiments, a non-prefix tree like N-gram index representation is provided, with improved space and time complexity for storage, access and update operations relative to Red-Black and other prefix based indexes. In some embodiments, a non-prefix representation of character N-grams for N greater or equal to 3 is built. First, the generation of 3-grams is discussed, follow by a discussion of the generation of N-grams of length 4 and 5. Optimized growth of longer character N-grams will also be described.

Figure 3:
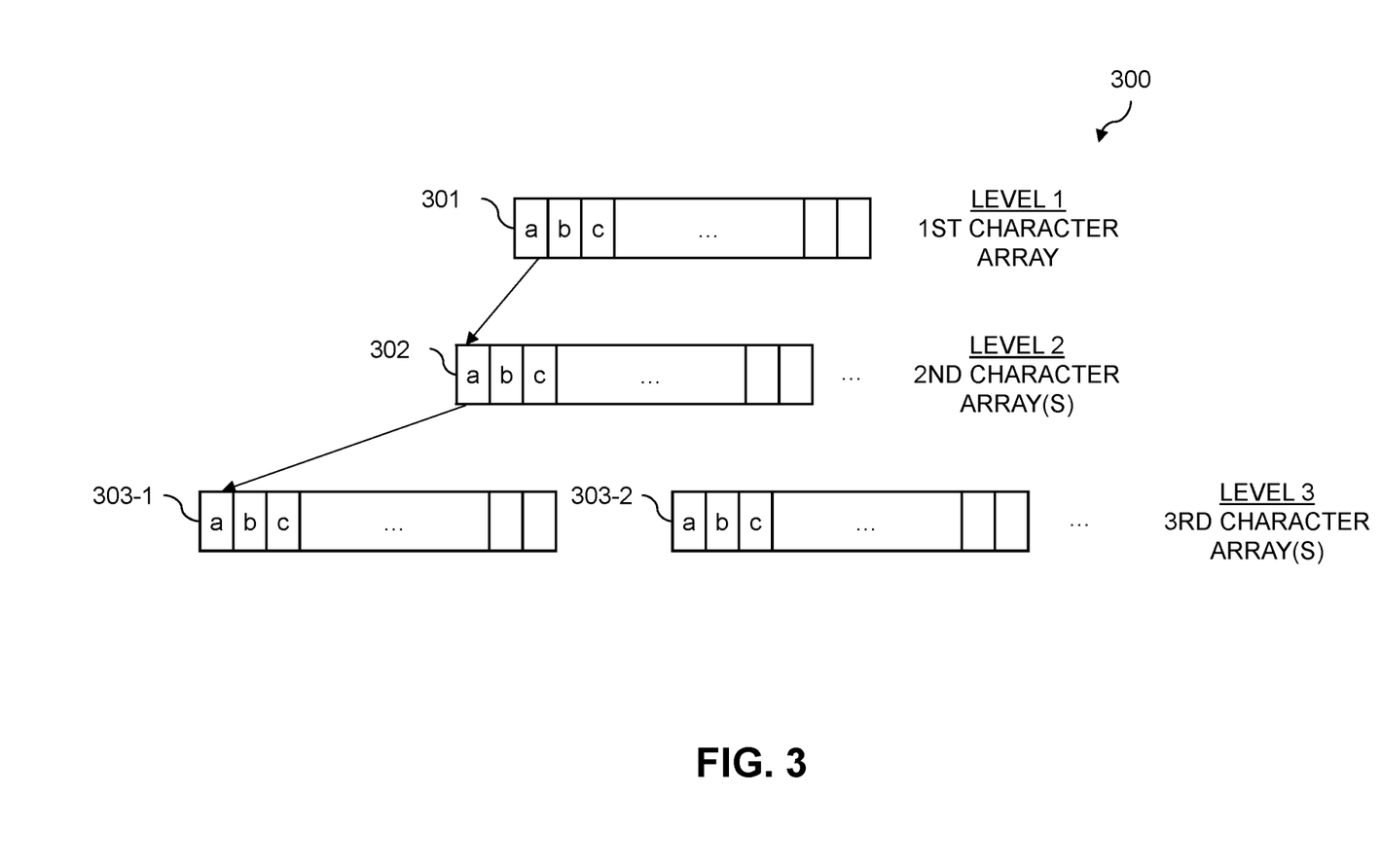
FIG. 3 shows an example of a three-level non-prefix tree structure in an illustrative embodiment.

FIG. 3 illustrates an approach for using a non-prefix tree-like representation 300 of N-grams. In a non-prefix tree, N-grams are generated by selecting one character from exactly one array at each level of the tree. The non-prefix tree-like representation 300 of FIG. 3 includes three levels for generating 3-grams. The first level has an array 301 for the first characters of 3-grams. The second level has a set of arrays 302 for the second characters of 3-grams. The third level has a set of arrays 303, with two specific arrays 303-1 and 303-2 shown, for third characters of 3-grams. Every N-gram has a unique (e.g., top-to-bottom) path in the non-prefix tree-like representation 300 that generates it, and no leaf node N-gram is a proper suffix of another leaf node N-gram.

The structure 300 can be implemented as follows. If prior knowledge suggests that all possible 3-grams over the English alphabet, $[a-z]^3$, are expected to be present in the collection of messages, then pre-allocate a direct-addressable array of size $26^3$B, that represents a non-prefix tree of depth 3 that ensures O(1) access to all 3-grams $[a-z]^3$. The first element of the array represents aaa, while the last represents zzz. The address of 3-gram $C_1C_2C_3$ is at offset $(C_1-1)26^2+(C_2-1)26+C_3$ in the array. The array is initialized such that all addresses are Null, and the array is updated with the address of the corresponding index when its 3-gram first appears in the data.

In the general case for an arbitrary alphabet, suppose that the alphabet that generates N-grams is $\Sigma$, and suppose that all 3-grams $\Sigma^3$ are expected to appear. In such a case, the length of the direct-addressable array is and the address of the index corresponding to 3-gram $C_1C_2C_3$ is found at offset $(C_1-1)|\Sigma|^2+(C_2-1)\Sigma+C_3$ in the array. The array is initialized such that all address are Null, and the array is updated with the address of the proper index when the corresponding 3-gram first appears in the data.

In the case where there is no prior knowledge of the number of 3-grams, to avoid waste of space some embodiments store each array at levels 1, 2 and 3 as shown in FIG. 3, instead of as a fixed-size array but as a sorted dynamic array containing the actual character and a pointer to the next level character array. The dynamic array structure will grow by doubling the size starting at 16 bytes, ensuring average case complexity of O(1).

Figure 4:
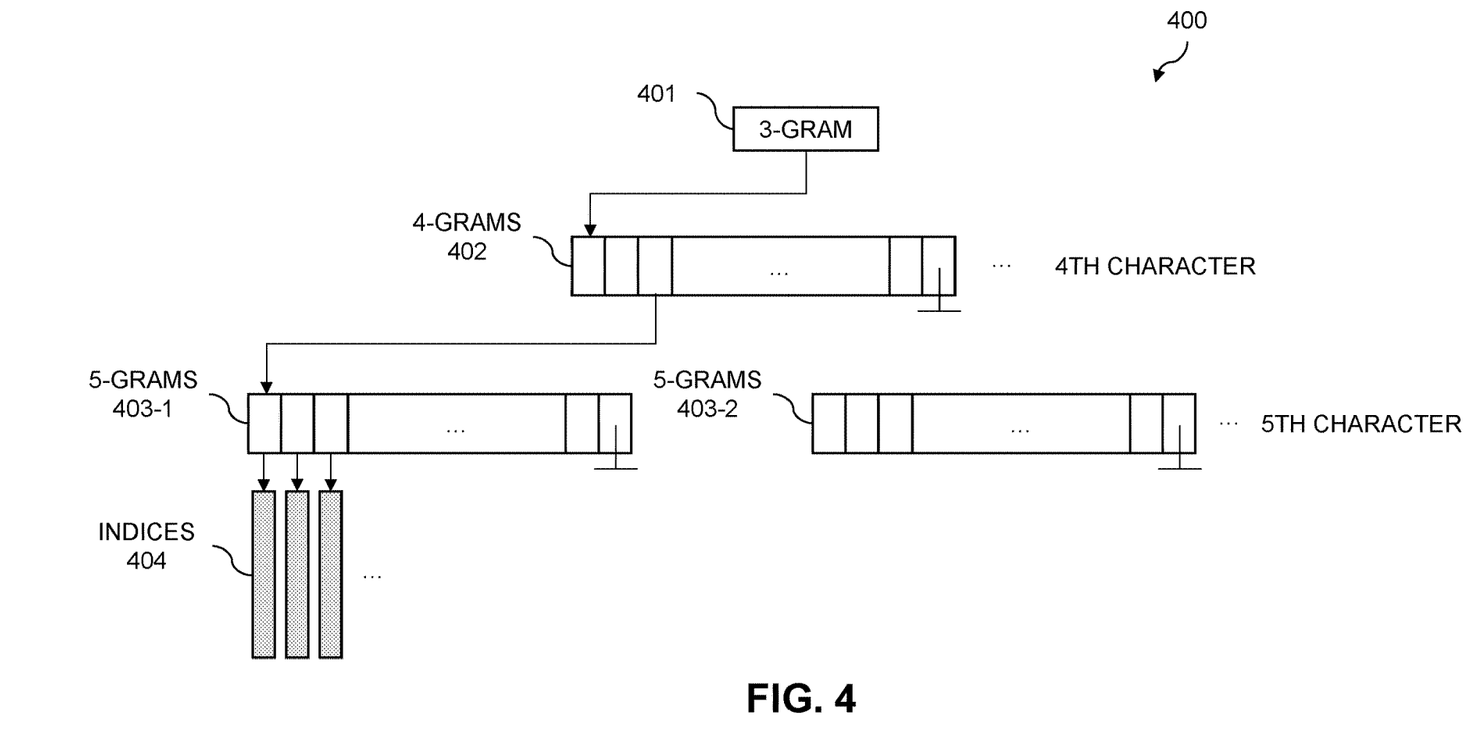
FIG. 4 shows an example of non-prefix growth of longer N-grams in an illustrative embodiment.

FIG. 4 illustrates the storage and generation mechanism for 4-grams and 5-grams in a non-prefix tree-like representation 400. In some embodiments, N-grams of size strictly greater than 3 are grown on demand only. The level arrays for the 4th character and 5th character (e.g., for 4-grams and 5-grams) that are superstrings of the 3-grams are implemented as sorted dynamic arrays. Again, the sorted dynamic array grows by a power of 2, starting at a size of 16 bytes, as needed. The representation 400 of FIG. 4 shows a 4th character level for 4-grams 402 and a 5th character level 403 for 5-grams that are superstrings of 3-gram 401. Although FIG. 4 shows only one 4-gram array 402, it should be appreciated that there may be multiple 4-gram arrays 402. Similarly, although only two 5-gram arrays 403-1 an 403-2 are shown, it should be appreciated that there may be more or fewer 5-gram arrays 403. Each of the arrays 402, 403 includes a Null-character slot (e.g., denoted by ⊥), to signify no further extension, which points to the index of records for the corresponding 3-gram 401. Each of the arrays 402, 403 contains entries with indices. For example, the first three entries of 5-gram array 403-1 have indices 404 as shown.

Assume, by way of example, that the 3-gram 401 is ABC. If a user issues a query for ABC*, the system will retrieve the union of records indexed by all 4-grams and 5-grams rooted at the 3-gram for ABC (e.g., arrays 402 and 403).

The non-prefix tree-like N-gram index structure described above and shown in FIGS. 3 and 4 provides various advantages. When compared to a Red-Black tree representation, for example, the non-prefix tree-like N-gram index structure that uses direct-addressing arrays for N-gram storage will save 3 machine addresses, the node color (e.g., 1 bit), and the actual N-gram string (which is implicitly derived but not stored). If compact dynamic arrays are used for the non-prefix tree-like N-gram index structure, then each array element will have to store a character from the alphabet and possibly a reference to the appropriate array for the next layer. There is still, however, a guaranteed savings of 2 machine addresses per N-gram relative to the Red-Black tree structure. Further, non-prefix tree-like N-gram index representation structures provide a more compact representation of the actual N-grams. The average case complexity of accessing and updating the non-prefix tree-like N-gram index representation structure is $O(1)$, even when the arrays are implemented as dynamic sorted arrays.

In some cases, it may be desirable to continue the growth of N-grams beyond 5-gram (e.g., where N>5). Longer N-grams will narrow the search, and will return possibly smaller and more relevant result-sets. Strategies for optimizing the growth of the longer N-grams (e.g., where $N \geq 6$) will now be discussed with respect to FIG. 5. It should be appreciated, however, that in some cases these strategies may be used when growing "shorter" N-grams as well (e.g., 4-grams and 5-grams).

Figure 5:
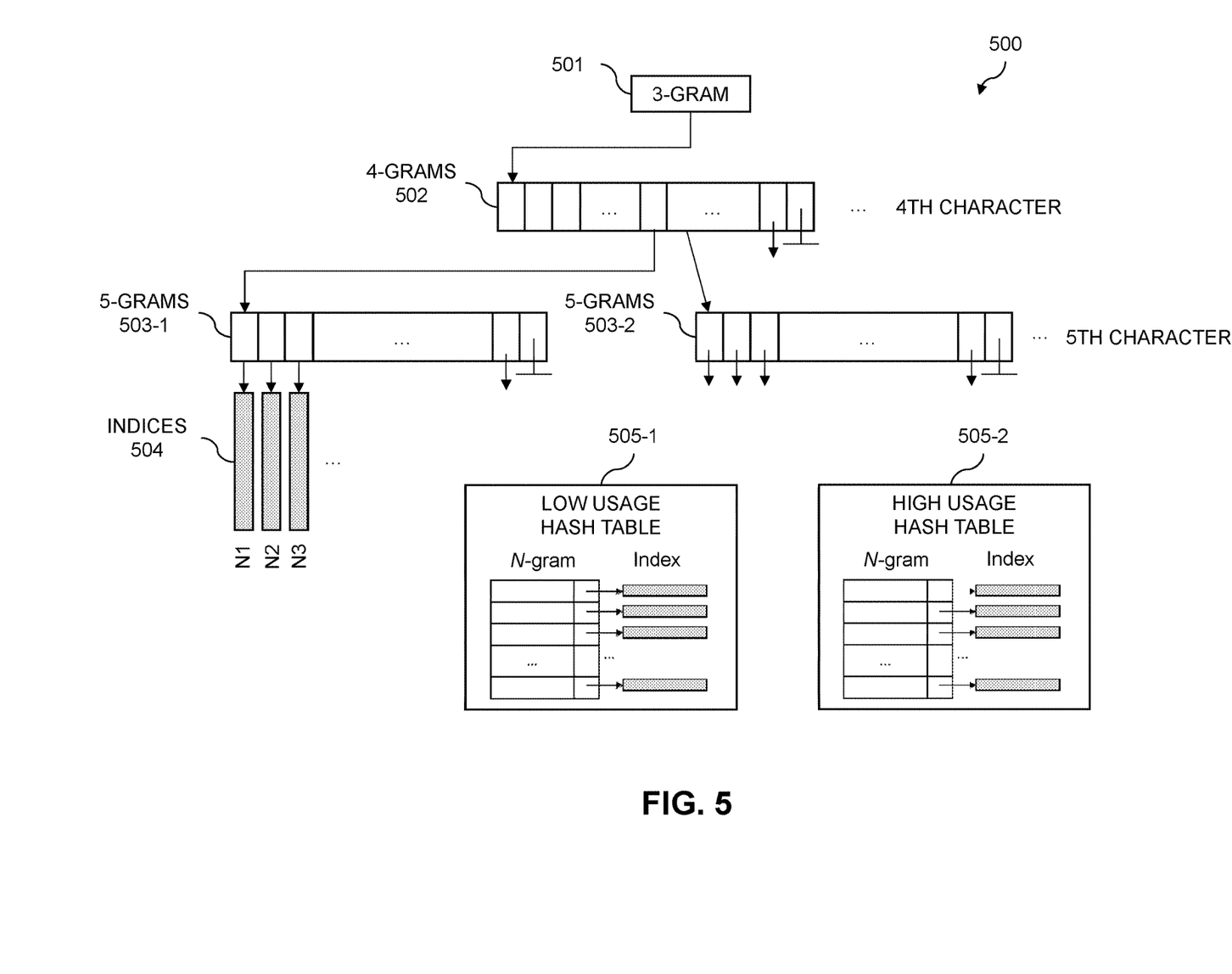
FIG. 5 shows an example of strategies for non-prefix growth of longer N-grams in an illustrative embodiment.

FIG. 5 shows a non-prefix tree-like representation 500 which, similar to FIG. 4, includes a 3-gram 501 and longer-character arrays for N-grams which are superstrings of the 3-gram 501. In particular, one 4th character array 502 is shown for 4-grams, and multiple 5th character arrays 503 are shown for 5-grams. Again, while FIG. 5 shows only one 4th character array 502 and two 5th character arrays 503-1 and 503-2, different numbers of such arrays may be used in other embodiments. Also, the symbol ⊥ is again used to denote a Null-character slot of the arrays 502 and 503 that signifies no further extension and which points to the index of records for the corresponding 3-gram 501. Each of the arrays 502, 503 contains entries with indices. For example, the first three entries of 5-gram array 503-1 have indices 504 as shown. Also shown in FIG. 5 are two hash tables, a low usage hash table 505-1 and a high usage hash table 505-2.

A first strategy for generating longer N-grams is based at least in part on index size. Long character N-grams are useful when the preceding N-gram occurs relatively frequently in the data. By generating long N-grams, the system could separately index message logs with completely different semantics. The length of the corresponding index is an approximation of the frequency of an N-gram in the data. A decision to further grow an N-gram may be made when the corresponding index exceeds some value K of the number of records in it. The value K may be pre-defined, be user-defined, or be a function of the lengths of all indexes (e.g., such as the mean, median, $3^{rd}$ quartile, etc.).

A second strategy for generating longer N-grams is based at least in part on index usage. Suppose that the system keeps track of how often each index is fetched or accessed during search and other query operations. Also, suppose that indexes that correspond to those frequently queried N-grams are large, indicating that they appear frequently in the data. In such a case, the hash tables 505 are generated, with a hash table 505-1 of high frequency and low usage N-grams and a hash table 505-2 of high frequency and high usage N-grams. The hash table 505-1 may be used to isolate large indexes of no or low usage (e.g., where Nj=0). The hash table 505-2 may include ones of the indices 504 with high usage statistics (e.g., where Nj is greater than some threshold F). Nj denotes the number of fetches for an index Ij in the past T period of time. The value of the threshold F and T may be determined experimentally for a particular dataset, or they may be pre-defined or user-defined.

When a query is issued, the hash table 505-2 is checked for a hit, and the non-prefix tree-like structure 500 is only used during hash table miss. The search optimization is implemented for a query N-gram term q, where if $|q| \geq 6$, the hash table 505-2 is further checked for a hit. It should be noted that this assumes the above strategies are used for growing "longer" N-grams where $N \geq 6$. This serves two purposes: (i) speeding up the access to high-demand indexes; and (ii) allows for a more flexible concurrency policy should the structure be used in a multi-threaded environment. The hash table 505-1 may be used to isolate large indexes of no or low usage, to distribute the indexes over multiple structures and to increase parallelism when multi-threading is available.

It should be appreciated that in some embodiments, combinations of the first and second strategies may be used for determining whether to generate longer N-grams for the indexing data structure.

The non-prefix tree-like indexing structures described above can be extended in some embodiments as described below. In some embodiments, a system will learn the "proper" alphabet set for the data. As described above, in some cases a fixed addressable array representation of each 3-gram is used for efficient access. For example, the English alphabet may be used in a fixed addressable array to represent the 3-grams subset of $[a-z]^3$. This is a restriction when larger alphabets are used. As described, above, for an arbitrary alphabet $\Sigma$ (e.g., for all UTF-8 characters), the 3-grams are a subset of $\Sigma^3$. Thus, using a fixed addressable array representation of all possible 3-grams for $\Sigma$ may be an overestimation, and could result in wasted space. Suppose, for example, that the direct-addressable array is sparse because many of the N-grams are not present in the data. Further suppose that some characters of the alphabet are never used to create N-grams. To learn the proper alphabet $\Sigma' \subset \Sigma$ of actively used characters, some embodiments may initially create the structure with size $\Sigma^3$ but also keep an array of active characters A of size $\Sigma$, which indicates if a character appears in the data or not. Initially, all entries of A are set to 0, but if a tri-gram contains a given character, then the corresponding entry in A is set to 1. This learning phase can last for a designated period of time (e.g., a few hours, a few days, etc.) depending on the rate of arrival of data. After the learning phase, $\Sigma'$ is used instead of for creating a direct-addressable array for all 3-grams in $[\Sigma']^3$.

Some embodiments may also use additional optimizations for frequent N-grams. For example, the system may be optimized to detect when a 3-gram only appears in the data set as a substring to a longer N-gram. To do so, some embodiments may use the frequency moments, which are approximated by the size of the indexes. This optimization is only useful when two or more N-grams are frequent and are part of the same superstring. A test can identify N-grams that should not be indexed in the future. Suppose that $C_1C_2C_3C_4C_5C_6$ is a 6-gram in the data set, with all $C_i$, i= 1 . . . 6 distinct characters. Further suppose that $C_1C_2C_3C_4C_5C_6$ has an index of size K, $C_1C_2C_3C_4C_5$ has an index of size K, $C_2C_3C_4C_5C_6$ has an index of size K, and that K is very large (e.g., where K is greater than a designated index size threshold, which may be pre-defined or user-defined). In such cases, a hash table is created where all three N-grams ($C_1C_2C_3C_4C_5C_6$, $C_1C_2C_3C_4C_5$, and $C_2C_3C_4C_5C_6$) share one index.

Embodiments provide a data structure for space and time efficient N-gram index generation and update operations. The data structure is useful for exact match or regular expression-driven search and retrieval of text or other records. The techniques for generating and utilizing such data structures can be applied to any text corpora, and are not restricted based on the length, structure or native language (e.g., alphabet) used to generate the text messages, documents or other records in the data set.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
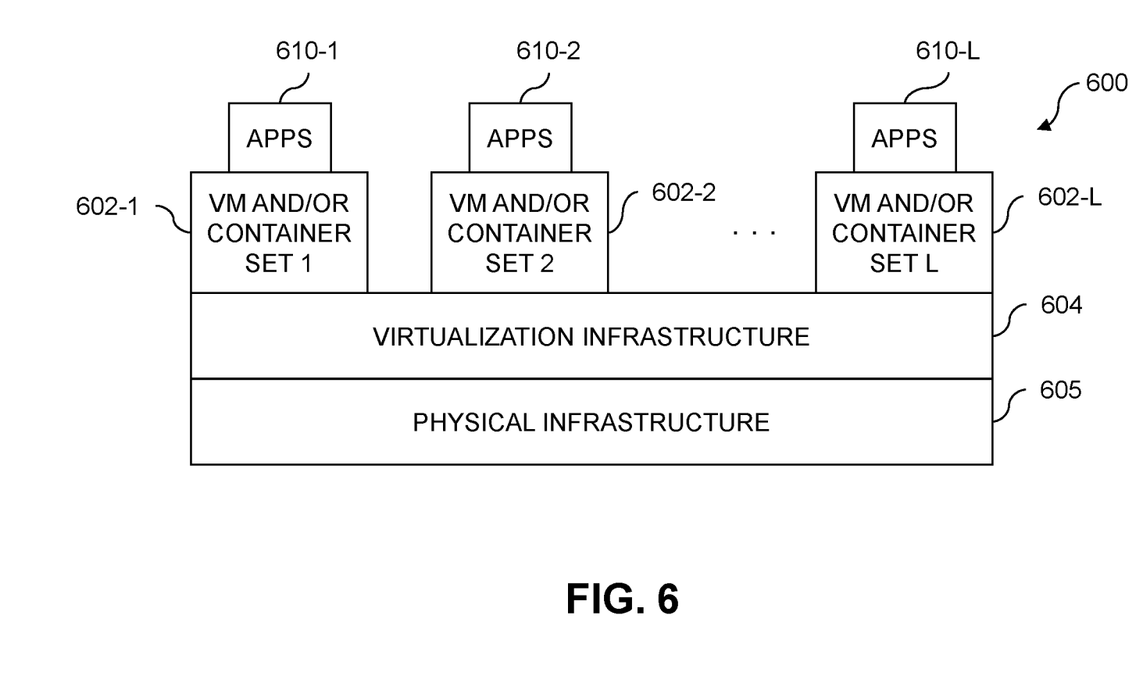
FIGS. 6 and 7 show examples of processing platforms that may be utilized to implement at least a portion of the FIG. 1 system.
Figure 7:
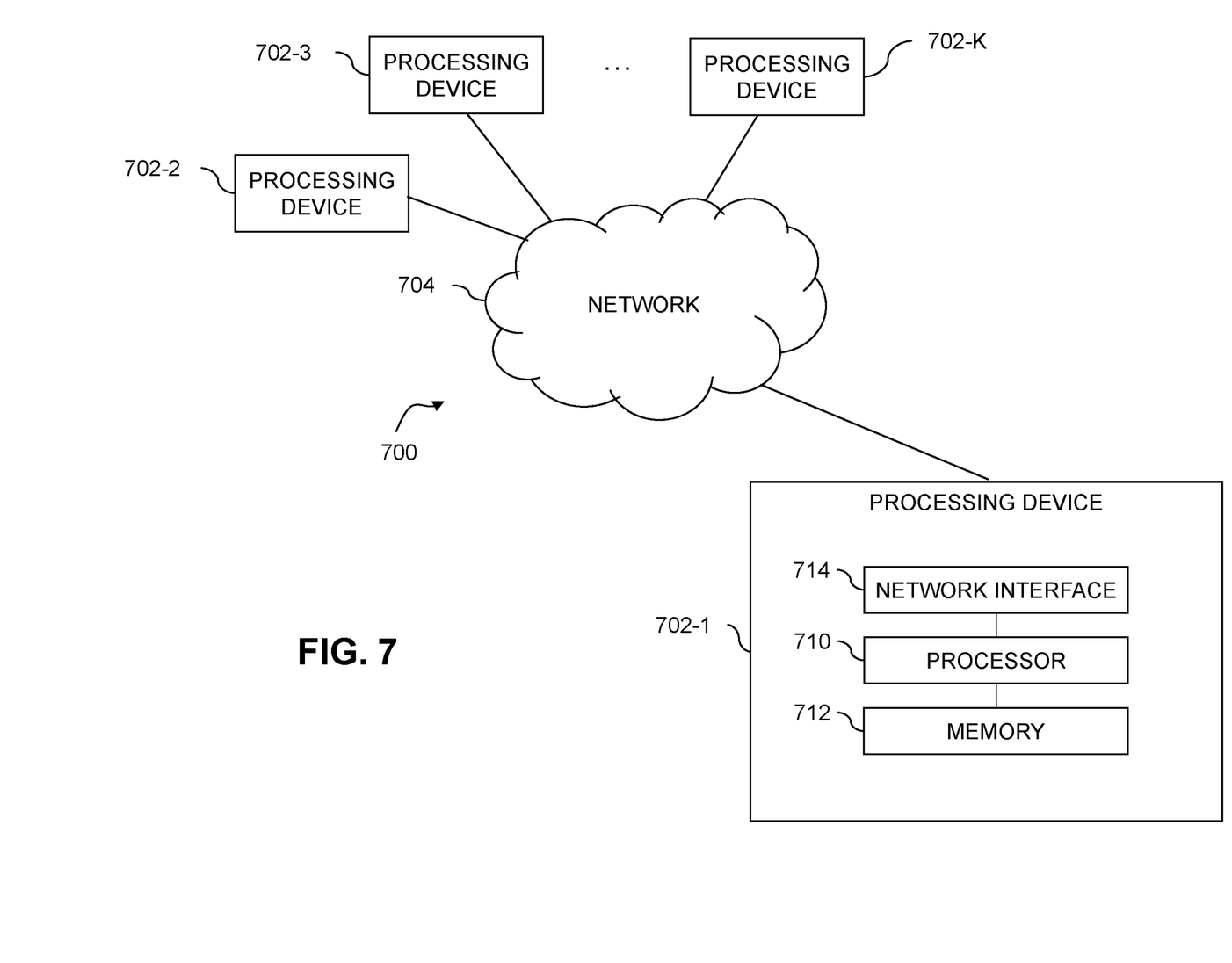

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for generating an addressable array indexing data structure of the type described above for one or more processes running on a given one of the VMs. For example, each of the VMs can implement such functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide functionality for generating an addressable array indexing data structure of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating an addressable array indexing data structure as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data management systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   initializing an addressable array indexing data structure comprising addresses for respective strings having a first length, the addressable array indexing data structure comprising two or more levels of character arrays, each of the two or more levels being associated with a corresponding character position in the strings having the first length;

extracting variable length strings from one or more records in a data set;

populating entries in the addressable array indexing data structure for extracted strings having the first length with addresses for indexes corresponding to those strings, wherein addresses for strings having the first length are generated by selecting a character value from a character array at each of the two or more levels in the addressable array indexing data structure;

receiving, from one or more client devices, one or more queries to records in the data set; and processing the one or more queries to the records in the data set utilizing the addressable array indexing data structure;

wherein the method is performed by at least one processing device comprising a processor coupled to a memory.

2. The method of claim 1 wherein the addressable array indexing data structure comprises a fixed size direct addressable array that pre-allocates entries for each possible string having the first length in a designated alphabet of characters.

3. The method of claim 2 wherein initializing the addressable array indexing data structure comprises setting entries in the fixed size direct addressable array to a null value, and updating entries in the fixed size direct addressable array with addresses of corresponding indexes for respective strings of the first length responsive to extracting instances of those strings from the one or more records in the data set.

4. The method of claim 1 wherein the addressable array indexing data structure comprises a sorted dynamic array that allocates address for respective strings having the first length responsive to extracting instances of those strings from the one or more records in the data set.

5. The method of claim 4 further comprising populating a given set of character values in the character arrays of the two or more levels in the addressable array indexing data structure responsive to extracting an instance of a string of the first length having the given set of character values.

6. The method of claim 1 further comprising dynamically generating one or more additional levels in the addressable array indexing data structure responsive to extracting one or more strings having a second length longer than the first length, a given one of the additional levels comprising a sorted dynamic character array having entries for a given additional character position.

7. The method of claim 6 further comprising populating entries in the addressable array indexing data structure with addresses for corresponding indexes for extracted strings having the second length, wherein addresses for strings having the second length are generated by selecting an address for a given string having the first length and at least one character value from a sorted character array at one or more of the additional levels in the addressable array indexing data structure.

8. The method of claim 6 wherein the extracted variable length strings comprise N-grams, the strings of the first length comprise 3-grams, and the strings of the second length comprise one of 4-grams and 5-grams.

9. The method of claim 6 wherein the second length is greater than the first length and below a designated threshold length.

10. The method of claim 9 further comprising determining whether to extend the addressable array indexing data structure with an address for a first string having a third length greater than or equal to the designated threshold length.

11. The method of claim 10 wherein determining whether to extend the addressable array indexing data structure with an address for the first string is based at least in part on a size of an index corresponding to a second string that is a substring of the first string.

12. The method of claim 10 wherein determining whether to extend the addressable array indexing data structure with an address for the first string is based at least in part on a usage of an index corresponding to a second string that is a substring of the first string.

13. The method of claim 10 further comprising maintaining a hash table of strings having the third length with usage greater than a designated threshold usage, and further comprising processing a query comprising a given string of the third length by checking the hash table for a hit and using the addressable array indexing data structure during hash table miss.

14. The method of claim 1 wherein initializing the addressable array indexing data structure comprises:

in a learning phase, determining whether respective characters in an alphabet of possible characters are utilized in the records of the data set; and initializing the addressable array indexing data structure with a fixed size direct addressable array that pre-allocates character values in the character arrays at each of the two or more levels that are determined to be utilized in the records of the data set during the learning phase.

15. A computer program product comprising a non-transitory processor-readable storage medium having stored therein program code of one or more software programs, wherein the program code when executed by at least one processing device cause the at least one processing device:

to initialize an addressable array indexing data structure comprising addresses for respective strings having a first length, the addressable array indexing data structure comprising two or more levels of character arrays, each of the two or more levels being associated with a corresponding character position in the strings having the first length;

to extract variable length strings from one or more records in a data set;

to populate entries in the addressable array indexing data structure for extracted strings having the first length with addresses for indexes corresponding to those strings, wherein addresses for strings having the first length are generated by selecting a character value from a character array at each of the two or more levels in the addressable array indexing data structure;

to receive, from one or more client devices, one or more queries to records in the data set; and to process the one or more queries to the records in the data set utilizing the addressable array indexing data structure.

16. The computer program product of claim 15 wherein the program code when executed further causes the at least one processing device to dynamically generate one or more additional levels in the addressable array indexing data structure responsive to extracting one or more strings having a second length longer than the first length, a given one of the additional levels comprising a sorted dynamic character array having entries for a given additional character position.

17. The computer program product of claim 16 wherein the second length is greater than the first length and below a designated threshold length, and wherein the program code when executed further causes the at least one processing device to determine whether to extend the addressable array indexing data structure with an address for a first string having a third length greater than or equal to the designated threshold length.

18. An apparatus comprising:
at least one processing device comprising a processor coupled to a memory;
the at least one processing device being configured:
to initialize an addressable array indexing data structure comprising addresses for respective strings having a first length, the addressable array indexing data structure comprising two or more levels of character arrays, each of the two or more levels being associated with a corresponding character position in the strings having the first length;
to extract variable length strings from one or more records in a data set;
to populate entries in the addressable array indexing data structure for extracted strings having the first length with addresses for indexes corresponding to those strings, wherein addresses for strings having the first length are generated by selecting a character value from a character array at each of the two or more levels in the addressable array indexing data structure;
to receive, from one or more client devices, one or more queries to records in the data set; and
to process the one or more queries to the records in the data set utilizing the addressable array indexing data structure.

19. The apparatus of claim 18 wherein the at least one processing device is further configured to dynamically generate one or more additional levels in the addressable array indexing data structure responsive to extracting one or more strings having a second length longer than the first length, a given one of the additional levels comprising a sorted dynamic character array having entries for a given additional character position.

20. The apparatus of claim 19 wherein the second length is greater than the first length and below a designated threshold length, and wherein the at least one processing device is further configured to determine whether to extend the addressable array indexing data structure with an address for a first string having a third length greater than or equal to the designated threshold length.

* * * * *